US006207769B1

(12) United States Patent
Gerlach et al.

(10) Patent No.: US 6,207,769 B1
(45) Date of Patent: Mar. 27, 2001

(54) POLYMER COMPOSITION

(75) Inventors: Ernst Gerlach, Mainz; Edouard Joseph, Hofheim; Klaus Kunz, Gau-Odernheim; Dieter Zaulig, Leckwitz, all of (DE)

(73) Assignee: Dow Corning GmbH, Weisbaden (DE)

( * ) Notice: Subject to any disclaimer, the term of this patent is extended or adjusted under 35 U.S.C. 154(b) by 0 days.

(21) Appl. No.: 09/343,336

(22) Filed: Jun. 30, 1999

(30) Foreign Application Priority Data

Jul. 1, 1998 (GB) .................................................. 9814212

(51) Int. Cl.[7] .................................................... C08L 83/04
(52) U.S. Cl. ........................ 525/476; 525/479; 428/451; 428/447; 524/114; 524/261; 528/32; 528/41; 528/15; 556/451
(58) Field of Search ..................................... 428/451, 447; 524/114, 261; 525/476, 479; 528/32, 41, 15; 556/451

(56) References Cited

U.S. PATENT DOCUMENTS

| | | | |
|---|---|---|---|
| 4,341,675 | 7/1982 | Nakamura | 524/266 |
| 4,686,124 | 8/1987 | Onohara et al. | 428/35 |
| 4,814,231 | 3/1989 | Onohara et al. | 428/425.5 |
| 5,366,806 | * 11/1994 | Fujiki et al. | |
| 5,418,065 | * 5/1995 | Fujiki et al. | |
| 5,585,445 | 12/1996 | Meguriya et al. | 525/476 |
| 5,744,541 | 4/1998 | Sawaguchi et al. | 524/588 |
| 5,792,812 | * 8/1998 | Fujiki et al. | |
| 5,891,969 | * 4/1999 | Mine et al. | |
| 6,077,892 | * 6/2000 | Feng et al. | |

FOREIGN PATENT DOCUMENTS

| | | | |
|---|---|---|---|
| 1 041 786 | 9/1966 | (GB) | C08F/37/00 |
| 1 588 510 | 4/1981 | (GB) | C08J/5/12 |
| 56-1333345 | 10/1981 | (JP) | C08K/5/54 |
| 1008218 | 3/1983 | (SU) | C08L/23/06 |

OTHER PUBLICATIONS

Polymer Science Dictionary, Mark S. M. Alger, Elsevier Science Publishers Ltd., 1989, pp. 367–368.*

* cited by examiner

*Primary Examiner*—Robert Dawson
*Assistant Examiner*—Kuo-Liang Peng
(74) *Attorney, Agent, or Firm*—William F. Boley; Jennifer S. Warren

(57) ABSTRACT

A polymer composition comprises a polymer matrix and a siloxane-containing additive which is substantially incompatible with the polymer matrix, wherein the siloxane of the additive has a hydroxy, alkoxy or epoxy functionality, and a functionality which is capable of bonding with a silicone elastomer-forming composition which is curable by a hydrosilylation reaction. The polymer matrix preferably comprises polyphenylenesulphide, and the additive preferably comprises hydroxy-terminated methylvinyl siloxane. The composition is capable of forming plastics articles to which cured silicone elastomers can adhere.

11 Claims, No Drawings

POLYMER COMPOSITION

The present invention relates to a polymer composition which comprises a polymer matrix and a siloxane-containing additive, which composition is capable of forming plastics articles to which cured silicone elastomers can adhere, in particular silicone elastomers cured by a hydrosilylation reaction, to a method for preparing a plastics article from said polymer composition, and to use of a siloxane-containing additive in the preparation of said polymer composition.

In many applications silicone elastomers are desirably applied to plastics substrates. For example, in the field of sealing and gasketing a gasket made from a silicone elastomer may be formed onto a plastics substrate. However, adhesion of the silicone elastomer to the plastics substrate can be poor and modification of the silicone elastomer and/or plastics substrate surface is often necessary for adhesion of the silicone elastomer to the plastics substrate. Modification of the silicone elastomer and/or plastics substrate surface is commonly achieved by the use of adhesion promoters, and silanes have been used for this purpose. Modification of a plastics substrate surface may be achieved, for example, by coating the surface with an adhesion promoter, or more conveniently by adding the adhesion promoter to the polymer melt prior to forming the plastics substrate. If the adhesion promoter is added to the polymer melt it is essential that adhesion promoter migrates to the surface of the polymer substrate if adhesion with an applied silicone elastomer is to be promoted. We have found that this migration does not always occur to a satisfactory extent when silane adhesion promoters are used, resulting in poor adhesion of an applied silicone elastomer.

U.S. Pat. Nos. 4,814,231 and 4,686,124 disclose thermoplastic resin-silicone composites wherein the resin may contain an organohydrogenpolysiloxane, e.g. vinyl-terminated organohydrogenpolysiloxane, for facilitating adhession of the resin to an addition curing silicone composition.

In a first aspect, according to the present invention there is provided a polymer composition which comprises a polymer matrix and a siloxane-containing additive which is substantially incompatible with the polymer matrix, wherein the siloxane of the additive has hydroxy, alkoxy or epoxy functionality and a functionality which is capable of bonding with a silicone elastomer-forming composition which is curable by a hydrosilylation reaction.

The present invention thus provides a polymer composition from which plastics articles can be formed, which composition may be prepared by simply mixing the additive with the polymer matrix melt and subsequently shaping the polymer composition to form the plastics substrate to which a silicone elastomer can adhere. The polymer composition according to the present invention has the further advantage of easing demolding of plastics substrates prepared therefrom compared to plastics substrates prepared from polymer melt not containing siloxane-containing additive used in the present invention.

The siloxane-containing additive used in the present invention is substantially incompatible with the polymer matrix. Herein "substantially incompatible" means that the additive will migrate to the surface of the polymer composition to allow bonding of the additive with the silicone elastomer-forming composition which is curable by a hydrosilylation reaction, but some compatibility between additive and polymer matrix is required so that complete separation of the additive from the polymer matrix does not occur as the additive might then bond only with the silicone elastomer and not the plastics substrate thus resulting in poor adhesion. The additive should act as a link between the molecules of the plastics substrate and the silicone elastomer.

Polymer matrices suitable for use in the polymer composition according to the present invention are well known in the art and include polysulphones, polyphenylenes, polyphenylenesulphide polyetherketones, polyimides, polyesters, polyethylene, polypropylene and phenolic and epoxy resins, with polyphenylenesulphide being preferred. As mentioned hereinbefore, the polymer matrix should be substantially incompatible with the siloxane-containing additive, but should not be totally incompatible therewith so as not to result in complete separation of the additive from the polymer matrix. The polymer matrix must melt to allow mixing of the additive therein and shape the polymer composition according to the present invention into a desired article, for example by molding. Mixing of the additive with the polymer matrix may be facilitated if the additive is a liquid at the melt temperature of the polymer matrix (i.e. the melt temperature of the polymer matrix is equal to or greater than the melt temperature of the additive). An example of a suitable polymer matrix is polyphenylenesulphide having a molecular weight of from 150,000 to 1,000,000.

The siloxane-containing additive for use in the present invention has a hydroxy, alkoxy or epoxy functionality and a functionality which is capable of bonding with a functional group of a silicone elastomer-forming composition which is curable by hydrosilylation reaction. Examples of functional groups which are capable of bonding with a functional group of a silicone elastomer-forming composition which is curable by hydrosilylation reaction include alkenyl (e.g. vinyl, hexen-1-yl) alkynyl, allyl, acrylate, methacrylate and silicon-bonded hydrogen groups. Preferably, the siloxane comprises units of the formula $R_aX_bSiO_{(4-a-b)/2}$ wherein R represents an alkyl group, most preferably a methyl group, X represents hydrogen, an alkenyl (e.g. vinyl, 5-hexenyl) alkynyl, allyl, acrylate, or methacrylate group, $\alpha$ is 1, 2 or 3 and b is 0, 1, or 2, and $\alpha+b \leq 3$, with the proviso that the siloxane molecule contains at least one group X. The siloxane may be either linear or cyclic. Examples of suitable additives having these functionalities are trimethylsilyl end-blocked methylvinylsiloxane, trimethylsilyl end-blocked methylhydrogensiloxane and trimethylsilyl end-blocked dimethylmethyl(5-hexenyl)siloxane. Lower molecular weight siloxanes, such as those having a viscosity of 1000 mm$^2$/s or less at 25° C., for example 10 to 100 mm$^2$/s, tend to have higher mobility in polymer matrices than siloxanes having a higher molecular weight, and this may be a determining factor in the ability of the siloxane additive to migrate to the surface of the polymer matrix. However, the molecular weight of the siloxane additive is not crucial provided the additive can migrate to the surface of the polymer matrix and is substantially incompatible therewith, as discussed hereinabove. There is no lower limit to the molecular weight of the siloxane, e.g. disiloxanes may be used as additives.

The additive used in the polymer composition according to the present invention should act as a link between the polymer matrix and the silicone elastomer to provide adhesion therebetween, and must not completely separate from the polymer matrix but must maintain a degree of bonding therewith. This additive-polymer matrix bonding may be a physical or chemical bond, and the additives thus comprise a siloxane which has a hydroxy, alkoxy or epoxy functionality for chemically bonding with the polymer matrix, in addition to the functionality for bonding with a silicone elastomer-forming composition which is curable by a hydrosilylation reaction. Suitable alkoxy groups include methoxy and ethoxy groups. The preferred functionality for bonding with the polymer matrix used in the present invention is hydroxy. Thus, a preferred additive for use in the polymer composition of the present invention is hydroxy-terminated methylvinylsiloxane, in particular hydroxy-terminated methylvinylsiloxane having a viscosity from 20 to 40 mm$^2$/s at 25° C.

Bonding of the siloxane-containing additive to the polymer matrix can also be aided using a silane having appropriate finctionalities to allow bonding of the silane to both the additive and the polymer matrix. As mentioned hereinbefore, the functionalities for bonding with the polymer matrix used in the present invention are hydroxy, alkoxy (e.g. methoxy, ethoxy) and epoxy, and preferred silanes have such a functionality together with a further functionality for bonding to the additive, i.e. the silane has a further functionality which can bond with the additive functionality which is capable of bonding with a silicone elastomer-forming composition which is curable by a hydrosilylation reaction. Thus, when a vinyl-functional containing siloxane additive is used a suitable silane may be trimethoxysilane (($CH_3O$)$_3$SiH), and when an Si-H containing siloxane additive is used a suitable silane may be vinyltrimethoxysilane (($CH_3O$)$_3$SiCH=$CH_2$). The silane may be premixed with the siloxane additive prior to addition of the additive to the polymer matrix or may be added directly to the polymer matrix separately from the siloxane additive.

The siloxane additive, together with any additional silane, may be added to the polymer matrix in an amount of from 0.1 to 5.0% by weight of the polymer matrix. Amounts less than 0.1% may not provide sufficient additive to adhere a silicone elastomer to a plastics substrate formed from the polymer composition of the present invention, and amounts greater than 5% may lead to fracture of said plastics substrate caused by morphology problems due to incompatibility of the additive with the polymer matrix. The exact amount of additive required will depend on the identity of the particular additive and the polymer matrix being used, but in general additive amounts of from 0.1 to 3% by weight of the polymer matrix are preferred, with amounts from 0.5 to 2.0% being most preferred.

In a second aspect, according to the present invention there is also provided a method for preparing a plastics article having a silicone elastomer cured by a hydrosilylation reaction adhered thereto, which method comprises preparing a polymer composition which comprises a polymer matrix and a siloxane-containing additive which is substantially incompatible with the polymer matrix, wherein the siloxane of the additive has hydroxy, alkoxy or epoxy functionality and a functionality which is capable of bonding with a silicone elastomer-forming composition which is curable by a hydrosilylation reaction by mixing together the siloxane-containing additive and the polymer matrix, forming the plastics article from the polymer composition, applying a silicone elastomer-forming composition which is curable by a hydrosilylation reaction to the plastics article, and allowing the silicone-elastomer forming composition to cure by a hydrosilylation reaction.

Silicone elastomer-forming compositions which are curable by a hydrosilylation reaction are known and commercially available and many have been described in the literature. Suitable elastomer-forming compositions comprise at least a siloxane polymer having aliphatic unsaturation and an organosilicon cross-linker having Si-H finctionality. Preferably the siloxane polymers are polyorganosiloxanes of a generally linear nature having the general structure (II)

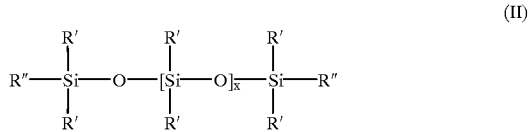

(II)

wherein R' is a monovalent hydrocarbon group having up to 18 carbon atoms, R" is a monovalent hydrocarbon group having up to 6 carbon atoms or a hydrogen atom, and x is an integer, for example having a value of from 10 to 1500. It is particularly preferred that R' denotes an alkyl or aryl group having from 1 to 8 carbon atoms, e.g. methyl, ethyl, propyl, isobutyl, hexyl, phenyl or octyl. More preferably at least 50% of all R' groups are methyl groups, most preferably substantially all R' groups are methyl groups. R" is preferably selected from an aliphatically unsaturated hydrocarbon group or a hydrogen atom. More preferably R" denotes an alkenyl group having up to 6 carbon atoms, more preferably vinyl, allyl or hexenyl suitable for hydrosilylation reactions.

Organosilicon cross-linkers are preferably selected from silanes, low molecular weight organosilicon resins and short chain organosiloxane polymers. The cross-linker compound has at least three silicon-bonded substituents which are capable of reacting with the silicon-bonded aliphatically unsaturated hydrocarbon groups or hydrogen atoms R" of the siloxane polymer described above. Where the group R" in the polymer is an alkenyl group, it is preferred that the reactive substituents on the cross-linking organosilicon compound are hydrogen atoms, allowing a hydrosilylation reaction between the cross-linking organosilicon compound and the polyorganosiloxane according to the general reaction scheme (I), wherein R'" is a divalent hydrocarbon group andy is 0 or 1.

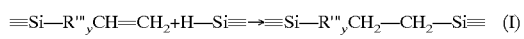

≡Si—R'"$_y$CH=$CH_2$+H—Si≡→≡Si—R'"$_y$$CH_2$—$CH_2$—Si≡  (I)

Suitable organosilicon cross-linking compounds include organosilicon resins consisting mainly of tetrafimctional siloxane units of the formula $SiO_{4/2}$ and monofunctional units R'$_v$R°$_w$$SiO_{1/2}$, wherein R' is as defined above, R° denotes a silicon-bonded substituent which may react with the silicon-bonded aliphatically unsaturated hydrocarbon groups or hydrogen atoms R" as discussed above, v and w each have a value of from 0 to 3, the sum of v+w being 3. Suitable short chain organosiloxane polymers include short chain polyorganosiloxanes having at least 3 silicon-bonded hydrogen atoms per molecule, e.g. trimethylsiloxane end-blocked polymethylhydrosiloxane having up to 20 carbon atoms and tetramethylcyclotetrasiloxane.

In addition to the siloxane polymers and the organosilicon cross-linking compounds, the elastomer-forming compositions preferably also comprise a suitable catalyst for the hydrosilylation addition reaction, most preferably a Group VIII metal-based catalyst, e.g. platinum chloride, or compounds or complexes of platinum or rhodium.

Other additional components may be included in suitable elastomer forming compositions, including fillers, chain extenders, dyes, adhesion promoters, colorants, pigments, viscosity modifiers, bath-life extenders, inhibitors and flexibilisers. Suitable fillers include silica, e.g. fumed silica, precipitated silica, gel-formation silica, aerosils, titania, ground quartz, ground cured silicone rubber particles, calcium carbonate and glass microspheres. Preferably the filler has been treated to make its surface hydrophobic, e.g. by treating with suitable silanes, short chain siloxanes, fatty acids or resinous silicone materials. Suitable materials and processes for rendering the surface of fillers hydrophobic have been described in the literature, and are known to the person skilled in the art. Adhesion promoters include epoxy-functional, organotitanates or amino-functional organosilicon compounds. Primers may also be used between shaping of the plastics article and adhesion of the silicone elastomer thereto, and suitable primers include titanate and silicate containing organic solvents and lower siloxanes, e.g. octamethyltetrasiloxane. Chain extenders tend to be organosiloxane materials which are predominantly linear in nature and which have a silicon-bonded group R° at each end of the polymer, allowing it to react with the R" group of two siloxane polymers, this merely extending the length of the siloxane polymer.

A particularly preferred elastomer-forming composition comprises an polyorganosiloxane having at least 2 silicon-bonded alkenyl groups per molecule, preferably vinyl, an organohydrogen cross-linking organosilicon compound, a Group VIII based catalyst and a filler. The ratio of these components in the elastomer-forming composition is not critical, although it is preferred that the alkenyl-functional polyorganosiloxane polymer and the organosilicon cross-linker having silicon-bonded hydrogen atoms are present in amounts which will ensure that at least one silicon-bonded hydrogen atom is present per alkenyl group, more preferably that the ratio would be from 1.1/1 to 5/1, most preferably from 2/1 to 4/1.

The polymer composition of the first aspect of the present invention is prepared by mixing the siloxane-containing additive with the polymer matrix material. Mixing may be achieved by any means conventional in the art for such procedures. For example, the polymer matrix material may typically be obtained in the form of pellets which can be added to a hopper which feeds into apparatus for processing the pellets and forming the plastics article, for example an extruder. In such an arrangement, the siloxane-containing additive may be sprayed onto the pellets in the hopper, or alternatively may be added to the extruder itself via an entry port. The pellets are melted in the extruder, wherein the siloxane-containing additive mixes with the polymer matrix melt to form the polymer composition according to the first aspect of the present invention. It is during the melt process and formation of the plastics article that the siloxane-containing additive migrates to the surface of the polymer composition. The plastics article may thus be formed from the polymer composition by extrusion, but may of course be formed by other means conventional in the art, for example by injection molding. It is of course possible for pellets of the polymer composition according to the first aspect of the present invention to be pre-prepared in the way described above, i.e. pellets of polymer matrix material already containing siloxane-containing additive may be prepared for future use. Such pellets may then be used as is conventional in the art for forming plastics articles without the need for the additional step of mixing the siloxane-containing additive therewith. The silicone elastomer-forming composition may be applied to the plastics article subsequent to forming the plastics article by applying the silicone elastomer-forming composition which is curable by a hydrosilylation reaction to the plastics article and allowing the silicone elastomer-forming composition to cure, or alternatively the silicone elastomer and the plastics article may be formed simultaneously, for example by co-molding. The latter has the advantage over the former of being a one-step as opposed to a two-step process, although the most suitable process to be employed will depend upon the nature of the article being made. For example, silicone elastomeric gaskets are preferably formed onto a plastics substrate subsequent to the formation of the latter. The silicone elastomer may also undergo post-cure to further improve adhesion thereof to the plastics article.

In a third aspect, the present invention further provides a use of a siloxane-containing additive having a hydroxy, alkoxy or epoxy functionality and a functionality which is capable of bonding with a silicone elastomer-forming composition which is curable by a hydrosilylation reaction in the preparation of a plastics article having a silicone elastomer cured by a hydrosilylation reaction adhered thereto.

The present invention will now be described in detail by way of example.

EXAMPLES

In a first step, polymer compositions according to the present invention were prepared as follows.

Siloxane-containing additive A (defined below) was mixed with polyphenylenesulphide (PPS) granulate in the amounts and combinations shown in Table 1 below. The first PPS granulate (Tedur 92001—"PPS-1") contained approximately 2.0 wt. % of polyethylene wax release agent, whereas the second PPS granulate (Tedur 92001 V2743—"PPS-2") did not contain a release agent. The additive A polymer composition was prepared by spraying the additive onto PPS-1 granulate.

The PPS granulate/siloxane-containing additive mixture was then fed to an injection mold feeder and heated to the temperatures shown in Table 1 below to form a polymer melt. Plastics articles were then prepared by feeding the polymer melt into an injection molder to form a rotary shaft seal for an automotive engine.

TABLE 1

| No. | PPS-1 | PPS-2 | Additive | Amount (wt. %) | Injection temp. of PPS (° C.) |
|---|---|---|---|---|---|
| 1 | X |   | — | — | 330 |
| 2 |   | X | A | 0.5 | 320 |

Additive A=approx. 30 mm $^2$/s (at 25° C.) hydroxy-terminated methylvinylsiloxane. "Tedur" is a registered trade mark of Bayer A. G.

In a second step, to form the silicone elastomer to be applied to the rotary shaft seals prepared in the aforementioned first step, a liquid silicone rubber-forming composition which is curable by a hydrosilylation reaction was prepared by mixing 50 parts dimethylvinyl-terminated dimethylsiloxane (viscosity approx. 55,000 mm $^2$/s), 25 parts dimethylvinylated and trimethylated silica, 17 parts quartz (treated with hexamethyldisilazane and tetramethyldivinyldisilazane), 4 parts dimethylhexenyl-terminated dimethyl, methylhexenylsiloxane, 2 parts dimethyl, methylhydrogensiloxane with methyl silsesquioxane, and platinum-containing catalyst. Some of the plastics articles were primed with an octamethyltetrasiloxane based primer prior to application of the liquid silicone rubber-forming compositions, as indicated in Table 2 below. The part of the plastics article onto which the liquid silicone rubber-forming composition was to be applied were coated with the primer prior to application of said composition. The rubber-forming composition was then injection-molded onto the primed or unprimed plastics article and cured at the temperature and for the length of time indicated in Table 2 below. Some of the liquid silicone rubber seals were then post-cured at 160° C. for 1 hour as indicated in Table 2.

TABLE 2

| PPS No. | Primer | Mold temp. ° C. | Heat time (s) | Demolding | Post cure | Adhesion |
|---|---|---|---|---|---|---|
| 1 | No | 120 | 120 | Poor | No | No |
| 1 | Yes | 120 | 120 | Good | No | No |
| 1 | Yes | 120 | 120 | Good | Yes | Partial |
| 2 | No | 195 | 60 | Good | No | Yes |
| 2 | Yes | 195 | 60 | Good | No | Yes |
| 2 | Yes | 195 | 60 | Good | Yes | Yes |

These examples of the polymer composition and method according to the present ntion show how liquid silicone rubber can adhere to plastics articles made from said polymer osition compared to a lack of adherence of liquid silicone rubber to a plastics article made a polymer composition which does not contain siloxane-containing additive. These examples also illustrate the further advantage of the present invention in that the use of primers be avoided whilst retaining good adhesion of liquid silicone rubber to the plastics article.

That which is claimed:

1. A polymer composition which comprises a polymer matrix and a siloxane-containing additive which is substantially incompatible with the polymer matrix, wherein the siloxane of the additive has a first finctionality selected from the group consisting of hydroxy, alkoxy and epoxy groups, and a second finctionality which is capable of bonding with a silicone elastomer-forming composition which is curable by a hydrosilylation reaction.

2. A polymer composition according to claim 1 wherein the polymer matrix is selected from the group consisting of polysulphones, polyphenylenes, polyphenylene sulphide, polyetherketones, polyimides, polyesters, polyethylene, polypropylene and phenolic and epoxy resins.

3. A polymer composition according to claim 2 wherein the polymer matrix comprises polyphenylenesulphide.

4. A polymer composition according to claim 1 wherein the siloxane finctionality which is capable of bonding with a silicone elastomer-forming composition which is curable by a hydrosilylation reaction is selected from the group consisting of alkenyl, alkynyl, allyl, acrylate, methacrylate and silicon-bonded hydrogen groups.

5. A polymer composition according to claim 4 wherein the siloxane comprises units of the formula $R_aX_bSiO_{(4-a-b)/2}$ wherein R represents an alkyl group, X is selected from the group consisting of hydrogen, alkenyl, alkynyl, allyl, acrylate, and methacrylate groups, $\alpha$ is 1, 2 or 3, b is 0, 1 or 2, and $\alpha+b \leq 3$, with the proviso that the siloxane molecule contains at least one group X.

6. A polymer composition according to claim 1 which further includes a silane having a finctionality selected from the group consisting of hydroxy, alkoxy and epoxy groups.

7. A polymer composition according to claim 1 wherein the additive comprises hydroxy-terminated methylvinyl siloxane.

8. A polymer composition according to claim 1 which is in pellet form.

9. A method for preparing a plastics article having a silicone elastomer cured by a hydrosilylation reaction adhered thereto, which method comprises preparing a polymer composition which comprises a polymer matrix and a siloxane-containing additive which is substantially incompatible with the polymer matrix, wherein the siloxane of the additive has a first functionality selected from the group consisting of hydroxy, alkoxy and epoxy groups, and a second finctionality which is capable of bonding with a silicone elastomer-forming composition which is curable by a hydrosilylation reaction by mixing together the siloxane-containing additive and the polymer matrix, forming the plastics article from the polymer composition, applying a silicone elastomer-forming composition which is curable by a hydrosilylation reaction to the plastics article, and allowing the silicone-elastomer forming composition to cure by a hydrosilylation reaction.

10. A method according to claim 9 wherein the silicone elastomer-forming composition is applied to the plastics article subsequent to forming the plastics article.

11. A method according to claim 9 wherein the silicone elastomer and the plastics article are formed simultaneously.

* * * * *